June 1, 1965  E. F. DE HAAN ET AL  3,186,884

METHOD OF MANUFACTURING GRID PLATES

Filed April 21, 1961  2 Sheets-Sheet 1

INVENTOR
EDWARD F. DE HAAN.
JOHANNES J.A. JONKERS.
BY
AGENT

June 1, 1965  E. F. DE HAAN ET AL  3,186,884
METHOD OF MANUFACTURING GRID PLATES
Filed April 21, 1961  2 Sheets-Sheet 2

INVENTOR
EDWARD F. DE HAAN.
JOHANNES J.A. JONKERS.
BY
AGENT 3,186,884
METHOD OF MANUFACTURING GRID PLATES
Edward Fokko de Haan and Johannes Josephus Antonius Jonkers, both of Emmasingel, Eindhoven, Netherlands, assignors to North American Philips Company, Inc., New York, N.Y., a corporation of Delaware
Filed Apr. 21, 1961, Ser. No. 126,360
Claims priority, application Netherlands, May 2, 1960, 251,141
16 Claims. (Cl. 156—13)

The invention relates to a method of manufacturing grid plates having parallel metal strips and to grid plates manufactured by such a method. Moreover the invention relates to color television picture tubes provided with such a grid plate.

Electric discharge tubes, for example picture tubes for television, often comprise grids which contain only parallel, conductive members. It is not difficult to manufacture such grids if they are flat or curved in one direction; in this case they may be manufactured, for example, by winding wires on two or more supporting bars.

In special cases it is desirable to curve a grid, which comprises parallel, conductive parts only, in two directions. Such a grid no longer can be manufactured from thin wires, since a thin wire does not retain its shape sufficiently. Only by using thick wires could a shape with a curvature in two directions still be realized, but in this case also it will be extremely difficult to manufacture for example a spherically curved grid. In addition, such a grid captures many electrons.

It is known to use, in colour television picture tubes, such grids composed exclusively of parallel metal strips which are connected together electrically. Such a grid is provided at a small distance before a luminescent screen which contains stripes of luminescent material, in which two adjacent stripes, under electron bombardment, transmit a different color of light and the grid serves, for example, for focussing the electron beam or electron beams which write the picture on the screen. Further a picture tube for color television is known which comprises such a grid which, however, consists of two sets of adjacent wires being connected electrically interdigitally in which between the sets of wires a control voltage is applied for the color selection. Naturally, the above difficulties in curving grids present themselves to a higher degree in this composite grid.

A curvature of such grids in two directions, however, is most desired if the color screen is to be provided on the glass wall of the picture tube. For, this wall is curved in two directions, inter alia for reasons of strength. In order to avoid defects in the electron-optical reproduction and the control through the grid, this grid also should be curved in a certain correlation with the curvature of the picture screen.

The invention relates to a method of manufacturing grids comprising parallel metal strips which method deviates from the methods so far known for manufacturing such grids and which is particularly suitable for manufacturing grids which are to be curved in two directions, although also flat grid or grids curved in only one direction may be manufactured by means of this method.

The method according to the invention for manufacturing grid plates having parallel metal strips is characterized in that a metal plate which is provided with parallel rows of holes, in which the distance between the holes in a row is smaller than the distance between two rows, is covered at one side at least in some parts between the holes in each row with an electrically insulating material and is then subjected to the influence of an etching agent which acts upon the metal but substantially not upon the insulating material for a time sufficient for the holes in the metal plate in a row to grow to one continuous gap while between two adjacent rows of holes continuous metal strips remain which are connected together by bridges of insulating material.

With the method according to the invention, a grid is obtained having parallel metal strips which are connected by bridges of the insulating material. Consequently, an electron current cannot pass the grid at any point between two grid strips. However, not counting a small charging of the bridges, the grid, electrically, behaves as a grid consisting exclusively of parallel metal strips.

Etching may be performed in various manner. For example, a fluid etching agent may be sprayed against one or both sides of the grid plate, or the grid plate may be dipped in a bath containing an etching agent. To improve a regular etching it has appeared of advantage in this latter method to produce a flow of the etching agent in the same direction as the direction of the rows of holes. This flow may be obtained in a simple manner by suspending the plate to be etched in the right manner in the etching bath and then moving it so that the above flow occurs.

Alternatively, the etching agent may be a gas, if desired. If, for example, the grid plate is of iron, etching may be carried out with hydrogen chloride.

A copper grid plate may be etched in an aqueous or alcoholic ferric chloride solution.

Naturally, the etching agent acts upon all the metal parts with which it comes in contact. It has appeared that etching proceeds so that the holes are etched far more rapidly at the edges than that the material of the plate is acted upon in its thickness.

Because the distance between two holes in a row is smaller than the distance between two rows, the metal between two holes in a row is etched away sooner than the material between two rows. The thickness of the plate should of course be so large that at the instant that the holes in the rows join together, no piercing of the strips takes place in spite of the fact that also the thickness becomes smaller by etching, as a result of which shorter metal strips which are insulated from each other would be formed. Because, however the holes become larger more rapidly than the decrease in the thickness of the plate, it is not necessary that the thickness of the material be larger than the distance between two holes in a row. In fact, this will, however, be the case in general.

Because all the grid strips are connected together by insulating bridges after etching and consequently cohere very well mechanically, the grids manufactured according to the invention can easily be given a curvature in two directions. This is preferably performed so that the metal plate initially is already curved before covering it with insulating material. However, if desired the bending may even be performed after providing the insulating material and even after the etching treatment. In this case, however, the insulating material should be capable of standing this bending without detaching or breaking. This is possible, for example, when a more or less flexible synthetic resin or for example glass is chosen as the insulating material and bending is performed at a temperature such that the glass and possibly also the synthetic resin, is sufficiently flexible.

If glass is used as insulating material, ground glass powder or a mixture of raw materials from which glass is formed may be used as starting materials and this may be adhered to the metal plate by heating to above the melting point of the glass. Naturally, this melting point may not exceed the temperature at which the metal plate to be processed is still of a sufficiently stable shape. At any rate, the temperature should be below the melting point of the metal plate.

When using glass it has appeared that at the beginning of the melting sometimes drops are formed by a strong contraction of the glass. It is true, the glass becomes somewhat more liquid at higher heating but the places between the holes in a row sometimes are still badly covered. To prevent this, a non-melting substance which is not, or only sparingly, soluble in glass, for example alundum, may be added to the ground glass powder or the mixture of glass-forming raw materials.

The insulating material may be provided on the whole surface at one side of the metal plate. Since, however its only function is the mechanical connection of two adjacent metal strips, it is sufficient, according to a particular embodiment of the invention, to apply insulating material only on the parts of the metal plate between the apertures in a row. It is clear that in this embodiment it is not necessary to apply insulating material on all the parts of the plates between the holes in a row. For example, if the strength permits it, the bridges may be provided alternately. In special cases even fewer bridges may be used.

In the series production of grids according to the special embodiment of the invention described, the insulating material may be provided effectively between adjacent holes in a row. For that purpose a second metal plate having a corresponding number of holes is temporarily provided on the metal plate to be covered in a manner such that corresponding rows lie on each other; the parts between the holes of the upper metal plate, however, lie over the holes of the lower metal plate. If the insulating material is provided on the upper metal plate, it will pass through the holes of this plate and engage the parts between the holes of the lower metal plate.

Because the metal strips of the grid are connected by the insulating bridges, a point pattern will be formed on the picture screen, when the grid is used in a cathode ray tube, for example for reproducing television pictures or for recording oscillograms. However, this generally does not disturb the observation, particularly when the number of holes and also the quotient of the area of the apertures in the grid divided by the area of the grid surface is large. In television images and in particular in the case of color television images, a point pattern is even more pleasant to the eye than a line pattern.

If the distance from the holes at the end of a row to the edge of the plate to be etched is larger than the distance between two holes in a row, all the grid strips will be connected together at the sides after etching. If for some reason or other the grid strips are not all to have the same potential, this connection via the edge should consequently be interrupted. This may already be effected during etching by also making the distance from the last holes of one or more rows to the edge of the plate to be etched smaller than the distance between two rows of holes, and etching for such a period that the edge at the end of a row in question also is etched through. If this is done in all the rows of holes, a grid plate is formed in the end, in which all the strips are separated electrically. However, mechanically they still cohere together entirely by the bridges of insulating material. If definite grid strips are to be connected together again electrically, this may be performed for example by soldering them together with wires. It is clear that in this manner a great variety may be made of combinations of grid wires lying in a plane.

If the distance from all the holes at the end of the rows to the edges of the plate to be etched is not made small so that the edge is etched through, definite grid strips may be detached and definite grid strips may be left connected together during the etching treatment already.

For certain color television picture tubes it is necessary to provide, in front of the picture screen which comprises parallel stripes of luminescent material luminescing in different colors a grid which comprises two electrically separated parts having parallel wires or strips which are interdigitally connected together electrically. Each wire or strip of one part of the grid is consequently flanked by two wires or strips of the other part of the grid. Such a grid also may be manufactured in a simple manner by means of a method according to the invention. For that purpose, the distance between two holes at the end of two adjacent rows is made small so that in the etching treatment these holes also grow together. The decrease of the distance between two holes at the end of two adjacent rows may for example be performed so that these holes are provided with an extension at the sides facing each other. If a connection is made in this manner between two holes in the metal plate at the end of two adjacent rows at one side of the grid plate and a connection is made in the same manner at the other side between the hole at the end of one of these rows and the hole at the end of the adjacent row at the other side, a grid plate is formed after etching having grid strips engaging each other in the manner of the teeth of two combs. The backs of the two combs are formed by the two edges of the etched plates lying opposite to each other. These backs are still connected together by continuous metal strips beside the extreme rows of holes. If an interruption is provided somewhere in these two metal strips, two entirely separated comb-shaped grids are formed having parallel strips which form the teeth of the two combs, are insulated electrically from each other, but mechanically cohere entirely by the insulating bridges, and lie between each other.

The metal plates, with the holes to be etched may be obtained by means of known methods. A very suitable method is the etching of a metal plate after a lacquer layer has been provided on it, in which layer the desired hole pattern is provided chemophotographically.

The invention will now be described with reference to the accompanying drawing, in which.

Figure 1:
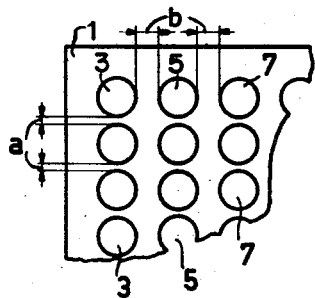
FIGURE 1 shows a part of a metal plate to be etched having circular holes.
Figure 8:
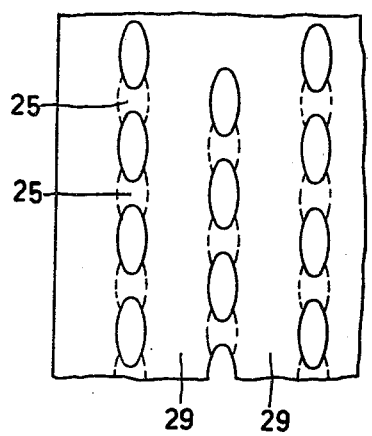
FIGURE 8 shows a part of a metal plate to be etched with oval apertures, the apertures in two adjacent rows staggering and insulating material being provided locally only.
Figure 10:
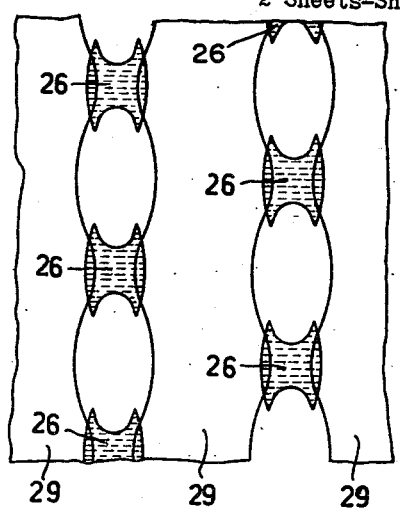
Figure 9:
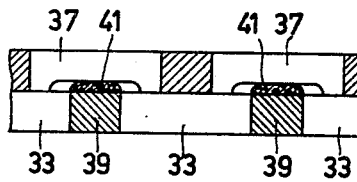
Figure 11:
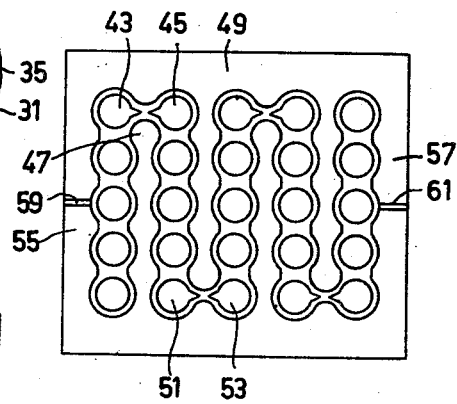
Figure 12:
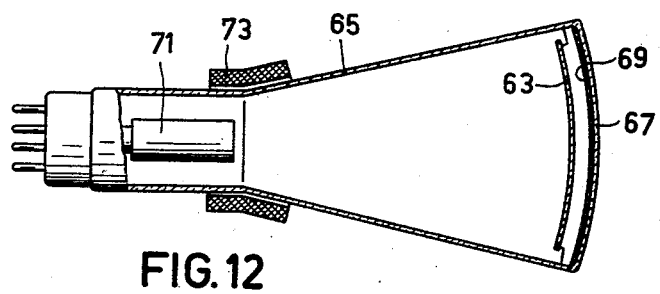

FIGURE 9 serves for illustrating a method which is preferably used for providing the local covering with insulating material of the plate as shown in FIGURE 8;

FIGURE 10 is an exaggerated view of the grid plate shown in FIGURE 8 after etching;

FIGURE 11 shows a metal plate with which two comb-shaped grids engaging each other may be made, and FIGURE 12 diagrammatically shows a colour television tube having a grid plate made with a method according to the invention;

In FIGURE 1, the metal plate initially is designated by 1. This plate is provided with parallel rows of circular holes 3—3, 5—5, and 7—7. The distances $a$ between the holes in a row are smaller than the distance $b$ between the holes of two adjacent rows.

Figure 2:
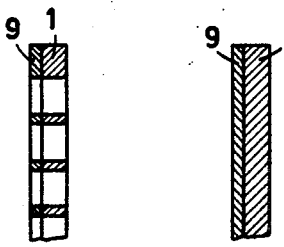
FIGURE 2 is a cross sectional view of one of the rows of holes of FIGURE 1.

FIGURE 2 is a cross-sectional view of the row of holes 3—3 shown in FIGURE 1. At the one side, the plate 1 is covered entirely with the insulating layer 9, for example consisting of glass.

Figure 3:
FIGURE 3 is a cross sectional view between two rows of holes of FIGURE 1.

FIGURE 3 is a cross-sectional view of the plate of

FIGURE 1 between the rows 3—3 and 5—5. In this case also the metal plate 1 is covered with the layer of insulating material 9.

Figure 4:
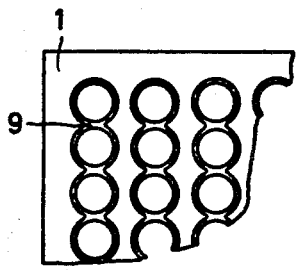
FIGURE 4 shows the part of the plate as shown in FIGURE 1 after the etching treatment.

If the plate covered with the insulating material 9 as shown in FIGURES 1, 2 and 3 is etched, for example by dipping in an etching bath, the metal is etched everywhere where it is not covered with insulating material. Starting from the holes this etching removes the material from the plate 1 in a substantially circular manner. After a definite time, the circles which are formed around the holes in a row will intersect, as a result of which a continuous connection between the holes of a row in the metal is formed. Because the distance $b$ according to the invention is chosen larger than the distance $a$, the circles around the holes in two adjacent rows will not yet intersect. So after etching a picture is formed of the plate as shown in FIGURE 4. The circular holes are provided in the layer of insulating material 9. As may be seen from this figure, the metal strips in the general direction are parallel although the edges are more or less sculptured after the etching treatment.

Figure 5:
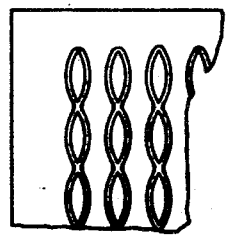
FIGURE 5 shows a part of a plate after the etching treatment having lenticular apertures.

It is not necessary to start from circular holes. The holes may, for example, be made more or less lenticular as shown in FIG. 5. In this figure the result is shown after etching. In this case, the edges of the metal strips have a smaller sculpture.

Figure 6:
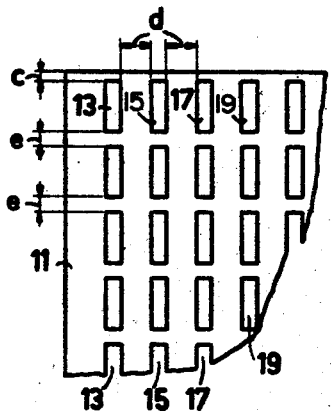
FIGURE 6 shows a part of a plate before the etching treatment having rectangular apertures, from which plate a grid plate with metal strips insulated completely electrically from each other is formed.
Figure 7:
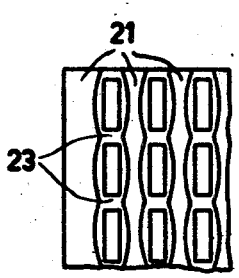
FIGURE 7 shows the plate of FIGURE 6 after the etching treatment.

FIGURE 6 shows a metal plate 11 having rectangular holes lying in rows 13—13, 15—15, 17—17 and 19—19. The distance $c$ from the extreme holes of the rows to the edge of the plate is smaller than the distance $d$ between the rows and so is the distance $e$ between two holes of a row. As a result of the etching, a structure will be obtained as shown in FIGURE 7. From this figure it appears that the metal strips are no longer connected together electrically. For, as a result of the small distances $c$, the metal there is etched away as far as the edge. Mechanically, the metal strips 21 still cohere entirely by the bridges 23 of the insulating material.

FIGURE 8 shows a part of a plate to be etched having oval holes. In contrast with the embodiment shown in the other figures, insulating material 25 is provided only between the apertures in one row which is designated by the dash lines.

If grids as shown in FIGURE 8 are manufactured in series, the insulating material may be provided between the holes of a row in a manner as shown in FIGURE 9. In FIGURE 9, 31 is the plate to be processed. This plate contains the holes of a row which are designated by 33. On this plate 31 a second plate 35 is provided having a number of corresponding holes 37. The holes 37 are provided centrally over the parts 39 between the holes 33. If insulating material, for example, glass powder, is provided through the holes 37, the parts 39 of the plates 31 are covered with it. This coating is designated by 41 and corresponds to the surfaces enclosed between the dash lines in FIGURE 8 and the bridges 26 in FIG. 10. This latter figure shows, on an enlarged scale, the results after the etching treatment. The glass bridges are designated by 26. In order to cause two adjacent metal strips 29 to cohere mechanically it is necessary, as appears from this figure, that so much insulating material is provided that part of it still coheres to the strips 29 after etching. This is very well obtained if the method as shown in FIGURE 9 is used.

It will now be explained, with reference to FIGURE 11, how two comb-shaped interdigital grids may be manufactured. It is assumed, for reasons of simplicity, that the metal plate to be etched is entirely covered with insulating material at one side. The holes 43 and 45 at the end of two adjacent rows have an extension at the side facing each other. This extension is already present in the plate before etching. The distance between the two extensions is made small so that, during etching, the two holes 43 and 45 in the metal plate grow together as shown in the figure. As a result of this, the metal strip 47 is detached from the edge 49. At the other side of the rows of holes it is effected in a corresponding manner that the holes 51 and 53 grow together. As appears clearly from the figure, a set of grid strips lying between each other like combs if formed in this manner. These combs are still connected together at the sides 55 and 57. To separate them from each other it is consequently necessary to interrupt the extreme metal strips, for example at 59 and 61.

FIGURE 12 diagrammatically shows a colour television tube which comprises a curved grid 63 manufactured by means of a method according to the invention. The tube further comprises a wall 65 having a screen part 67 on which the luminescent screen 69 is provided. The electron gun is designated by 71 and the system of deflection coils by 73.

Below some dimensions are given of a grid plate having oval holes suitable for a colour television picture tube having a rectangular picture screen with a diagonal of 45 cm.

The thickness of the metal plate is from 0.2 to 0.5 mm. The distance between the centre lines of two adjacent rows is 600 microns and the distance between two adjacent holes ($b$) is 150 microns. The distance between two holes ($a$) is 40–60 microns. The length of the oval hole is approximately 1.2 mm. and the maximum width 450 microns. The distance from the holes at the end of each row to the edge of the plate is at least 1 cm.

What is claimed is:

1. A method of manufacturing grid plates having parallel metal strips comprising the steps, providing a metal plate with a plurality of parallel rows of apertures in which the distance between apertures in a row is less than the distance between apertures in adjacent rows, covering only one side of at least portions of the plate between apertures in each row with an electrically insulating material, and subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

2. A method of manufacturing grid plates having parallel metal strips comprising the steps, providing a metal plate curved in at least one direction with a plurality of parallel rows of apertures in which the distance between apertures in a row is less than the distance between apertures in adjacent rows, covering only one side of at least portions of the plate between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

3. A method of manufacturing grid plates having parallel metal strips comprising the steps, providing a metal plate with a plurality of parallel rows of apertures in which the distance between apertures in a row and between a terminal aperture in each row and the corresponding edge of the plate is less than the distance between apertures in adjacent rows, covering only one side of at least portions of the plate between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

4. A method of manufacturing grid plates having parallel metal strips comprising the steps, providing a metal plate with a plurality of parallel rows of apertures in which each aperture has a principal axis extending parallel to the direction of the row of apertures and in which the distance between apertures in a row is less than the distance between apertures in adjacent rows, covering only one side of at least portions of the plates between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

5. A method of manufacturing grid plates having parallel metal strips comprising the steps, providing a metal plate with a plurality of parallel rows of apertures in which the distance between apertures in a row is less than the distance between apertures in adjacent rows, covering only one side of the plate only between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

6. A method of manufacturing grid plates having parallel metal strips comprising the steps, providing a metal plate curved at least in one direction with a plurality of parallel rows of apertures in which the distance between apertures is a row is less than the distance between apertures in adjacent rows, covering only one side of the plate only between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

7. A method of manufacturing grid plates having parallel metal strips comprising the steps, providing a metal plate curved in at least one direction with a plurality of parallel rows of apertures in which the distance between apertures in a row and between a terminal aperture in each row and the corresponding edge of the plate is less than the distance between apertures in adjacent rows, covering only one side of the plate only between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gaps while between adjacent rows a continuous metal strip is retained.

8. A method of manufacturing grid plates having parallel metal strips comprising the steps, providing a metal plate curved at least in one direction with a plurality of parallel rows of apertures in which each aperture has a principal axis extending parallel to the direction of the row of apertures and in which the distance between apertures in a row is less than the distance between apertures in adjacent rows, covering only one side of the plate only between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in the metal plate with bridges of insulating material across the gap while between adjacent rows a continuous metal strip is retained.

9. A method of manufacturing grid plates having parallel metal strips comprising the steps, providing a first metal plate with a plurality of parallel rows of apertures in which the distance between apertures in a row is less than the distance between apertures in adjacent rows, providing a second plate similar to the first plate, placing the second plate over the first plate so that the apertures in one row of the second plate are positioned over portions of the first plate between apertures in a corresponding row of the first plate, depositing an electrically insulating material in the apertures of the second plate thereby covering the portions of only one side of the first plate between apertures in a row with insulating material, removing the second plate, subjecting the thus-covered first plate to the action of an etching agent which acts upon the metal but which is substantially inert toward said insulating material for a time sufficient for the apertures in a row to enlarge and form a continuous gap in the first metal plate with bridges of insulating material across the gap while between adjacent rows a continuous metal strip is retained.

10. A method of manufacturing grid plates having parallel metal strips comprising the steps, providing a metal plate curved in at least one direction with a plurality of parallel rows of apertures in which the distance between apertures in a row is less than the distance between apertures in adjacent rows, covering only one side of at least portions of the plate between apertures in each row with glass, subjecting the thus-covered plate to the action of an etching agent which acts upon the metal but which is substantially inert toward said glass for a time sufficient for the apertures in a row to enlarge and form a continuous gap in the metal plate with glass bridges across the gap while between adjacent rows a continuous metal strip is retained.

11. A method of manufacturing grid plates having parallel metal strips comprising the steps, providing a metal plate curved in at least one direction with a plurality of parallel rows of apertures in which the distance between apertures in a row is less than the distance between apertures in adjacent rows, covering only one side of the plate only between apertures in each row with glass, subjecting the thus-covered plate to the action of an etching agent which acts upon the metal but which is substantially inert toward said glass for a time sufficient for the apertures in a row to enlarge and form a continuous gap in the metal plate with glass bridges across the gap while between adjacent rows a continuous metal strip is retained.

12. A method of manufacturing grid plates having parallel metal strips comprising the steps, providing a metal plate curved in at least one direction with a plurality of parallel rows of apertures in which the distance between apertures in a row is less than the distance between apertures in adjacent rows, covering only one side of at least portions of the plate between apertures in each row with glass containing a substance relatively insoluble in glass and which has a melting point much higher than that of glass to counteract the formation of glass drops during melting, subjecting the thus-covered plate to the action of an etching agent which acts upon the metal but which is substantially inert toward said glass for a time sufficient for the apertures in a row to enlarge and form a continuous gap in the metal plate with glass bridges across the gap while between adjacent rows a continuous metal strip is retained.

13. A method of manufacturing grid plates having parallel metatl strips comprising the steps, providing a metal plate curved in at least one direction with a plurality of parallel rows of apertures in which the distance between apertures in a row is less than the distance between apertures in adjacent rows, covering only one side of the plate only between apertures in each row with glass containing alundum, subjecting the thus-covered plate to the action of an etching agent which acts upon the metal but which is substantially inert toward said alundum-containing glass for a time sufficient for the apertures in a row to enlarge and form a continuous gap in the metal plate with glass bridges across the gap while between adjacent rows a continuous metal strip is retained.

14. A method of manufacturing grid plates having parallel metal strips comprising the steps, providing a metal plate with a plurality of parallel rows of apertures in which the distance between apertures in a row and between terminal apertures in adjacent rows is less than the distance between apertures other than terminal apertures in adjacent rows, covering only one side of at least portions of the plate between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in each row and between the terminal apertures in the metal plate with bridges of insulating material across the gap while between the other apertures in adjacent rows a continuous metal strip is retained.

15. A method of manufacturing grid plates having parallel metal strips comprising the steps, providing a metal plate with a plurality of parallel rows of apertures in which the distance between apertures in a row is less than the distance between apertures in adjacent rows, enlarging the terminal apertures in adjacent pairs of rows to shorten the distance therebetween, covering only one side of at least portions of the plate between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in each row and between the terminal apertures in the metal plate with bridges of insulating material across the gap while between the other apertures in adjacent rows a continuous metal strip is retained.

16. A method of manufacturing grid plates having parallel metal strips comprising the steps, providing a metal plate with a plurality of parallel rows of apertures in which the distance between apertures in a row is less than the distance between apertures in adjacent rows, enlarging the terminal apertures in adjacent pairs of rows to shorten the distance therebetween, covering only one side of at least portions of the plate between apertures in each row with an electrically insulating material, subjecting the thus-covered plate to the action of an etching agent which acts upon the metal but which is substantially inert toward said insulating material for a time sufficient for the apertures in a row to enlarge and form a continuous gap in each row and between the terminal apertures in the metal plate with bridges of insulating material across the gap while between the other apertures in adjacent rows a continuous metal strip is retained, and interrupting the metal strip between a row of apertures and an adjacent edge of the metal plate.

References Cited by the Examiner

UNITED STATES PATENTS

| | | | |
|---|---|---|---|
| 2,565,623 | 8/51 | Parker | 156—7 |
| 2,610,305 | 9/52 | Watrous | 313—348 |
| 2,621,303 | 12/52 | Law | 313—348 |
| 2,663,821 | 12/53 | Law | 156—7 XR |
| 2,721,952 | 10/55 | Kenyon | 313—348 |
| 2,738,438 | 3/56 | Shepherd | 313—348 |
| 2,762,036 | 9/56 | Triman | 156—7 |
| 2,849,299 | 8/58 | Young | 156—8 |
| 2,881,059 | 4/59 | Spencer | 156—7 |
| 2,885,524 | 5/59 | Eisler | 156—7 |
| 2,958,147 | 11/60 | Monahan | 156—7 XR |
| 2,981,610 | 4/61 | Snyder et al. | 156—8 XR |
| 2,988,667 | 6/61 | Armstrong | 313—348 |
| 3,020,433 | 2/62 | Day | 156—8 |
| 3,081,210 | 3/63 | Wolf et al. | 156—8 |
| 3,116,191 | 12/63 | Day | 156—8 |

EARL M. BERGERT, *Primary Examiner.*

HAROLD ANSHER, CARL F. KRAFFT, *Examiners.*